United States Patent Office
3,542,771
Patented Nov. 24, 1970

3,542,771
PROCESS FOR THE PREPARATION OF CHOLEST-6-ONE-20α$_F$-OL AND THE INTERMEDIATES OBTAINED THEREFROM
Andor Furst and André Furlenmeier, Basel, Albert Langemann, Binningen, and Guy Waldvogel, Riehen, Switzerland, Peter Hocks, Albert Jager, Ulrich Kerb, and Rudolf Wiechert, Berlin, Germany, assignors to Hoffmann-La Roche Inc, Nutley, N.J., a corporation of New Jersey
No Drawing. Filed Dec. 29, 1967, Ser. No. 694,363
Claims priority, application Germany, Jan. 7, 1967, 1,618,998
Int. Cl. C07c 173/00
U.S. Cl. 260—239.55   15 Claims

ABSTRACT OF THE DISCLOSURE

Pregna-6,20-diones are selectively reacted at the 20-position with a Grignard reagent or a metal acetylide. 22-yne compounds are selectively hydrated yielding 22-oxo compounds. Products are converted into known insect metamorphosis hormones.

CROSS REFERENCE TO RELATED APPLICATIONS

This application is related to Ser. No. 571,187, filed Aug. 9, 1966 now abondoned, and Ser. No. 662,303, filed Aug. 22, 1967 now Pat. No. 3,478,065.

BRIEF DESCRIPTION OF THE INVENTION

This invention comprises a selective reaction of pregna-6,20-diones and also selective hydration of 20-ol-22-yne steroids.

DETAILED DESCRIPTION OF THE INVENTION

This invention relates to novel compounds and synthetic methods useful in the syntheses of steroids. In one embodiment this invention comprehends a process for the preparation of a cholest-6-on-20α$_F$-ol which comprises reaction of a pregna-6,20-dione with a Grignard reagent or a metal acetylide. When either a metal acetylide or a Grignard reagent containing a lower alkynyl moiety is used, there is obtained a 22-yne compound. A separate embodiment of this invention relates to a process for the separation of a cholest-6,22-dion-20α$_F$-ol which comprises hydration in the presence of an acid catalyst of a cholest-6-on-20α$_F$-ol-22-yne. As used herein the formative "cholest" is used in its generic sense, i.e., to indicate a cyclopentaphenanthrene steroid nucleus containing a 17β-ethyl moiety which itself contains a side chain bonded to the 20-position by a carbon-carbon bond. More particularly, this invention relates to a method for the preparation of a cholest-6-on-20α$_F$-ol of the formula

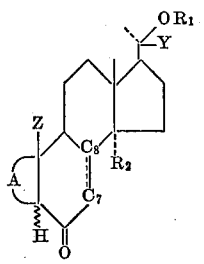

I wherein $R_1$ is hydrogen, lower alkyl or acyl;
$R_2$ is hydrogen or hydroxy;
Z is hydrogen or methyl;
Y is straight or branched chain lower alkyl, lower alkenyl or lower alkynyl which can be substituted by hydroxy, esterified hydroxy or etherified hydroxy, or oxo;

$C_7 \equiv\!\!\equiv C_8$ is a saturated or unsaturated carbon-carbon bond;
A is the A-ring in the steroid nucleus; and
the molecule otherwise contains only substituents inert to the reagent employed in the process of this invention and the 5-position hydrogen atom can be in the α- or β-position which comprises selectively reacting the 20-keto group of a corresponding 6,20-diketosteroid with a reagent of the formula Y·MgX wherein Y has the same meaning as above and X is chlorine, bromine, iodine or metal acetylide.

In those instances where Y is lower alkynyl in the products of Formula I, water can be added to the carbon-carbon triple bond in the presence of an acid catalyst surprisingly resulting in the formation of a 22-keto moiety. In the products of Formula I, hydroxy groups other than a 14α-hydroxy can be esterified or etherified, any acyloxy groups present saponified or ether groups present split. In those products of Formula I wherein $R_2$ is hydrogen, a hydroxy group can be introduced in the 14α-position by known methods; either purely chemical or biologically by means of 14α-hydroxylating micro-organisms or their enzymes. As additional substituents which are inert to the reagents used in the reaction of this invention there are comprehended lower alkyl, preferably methyl, in, for example, the 1-, 7- or 16-position; hydroxy or acyloxy groups in, for example, the 1-, 2-, 3-, 11-, 16- or 17-position; or a isopropylidenedioxy group in the 2,3-position; keto or functionalized keto, for example, as ketal, groups in, for example, the 11- or 3-position; or additional double bonds, for example, in the 1(2)- or in the 3(4)-position. "Acyloxy" as used herein comprehends the acyl moieties of carboxylic acids, for example, lower alkanoyloxy moieties such as acetoxy or the like. Especially preferred as ketals are those formed from lower alkane diols yielding lower alkylenedioxy moieties, for example, ethylenedioxy.

The symbol Y in the products prepared according to the process of this invention can be, for example, lower alkyl such as propyl, isopropyl, butyl, isobutyl, butynyl, pentyl, isopentyl, lower alkynyl such as pentynyl, isopentynyl, hydroxy and/or oxo-lower alkyl or lower alkynyl such as 2-methyl-2-hydroxy-3-butyn-4-yl, 2-methyl-2-hydroxy-4-pentyn-5-yl, 2-methyl-2-hydroxy-5-oxo-pent-5-yl, 2-methyl-1-hydroxy-5-oxo-pent-5-yl and the like. In those compounds to be used as starting materials in the process of the invention wherein Y contains hydroxy, as for example in the aforementioned 2-methyl-2-hydroxy-4-pentyn-5-yl or 2-methyl-2-hydroxy-3-butyn-4-yl moieties, it is advantageous to protect the hydroxy group before conducting the process of the invention, for example, by formation of a protecting group, such as the tetrahydropyranyl ether, which protecting group can, if desired, be split off after the process of this invention is effected.

The process of this invention is surprising because it was not to be expected that in spite of the simultaneous presence of the 6-keto group in the starting material only the 20-keto group would react thereby making possible selective introduction of the moiety represented by the symbol Y in the 20-position. It is also surprising that this selective introduction of the Y moiety proceeds stereospecifically with formation of a 20-hydroxy group substantially only in the 20α$_F$-position. This is especially important because the compounds of the type described herein are only biologically active if the 20-hydrxoy is in the 20α$_F$-position.

Also surprising was the selective formation of the oxo group in the 22-position by addition of water to the carbon-carbon triple bond of the product initially obtained upon introduction of the alkynyl side chain.

The selective introduction of the moiety Y by means of the reagent Y·MgHal is suitably conducted in a solvent inert to the Grignard reagent such as, for example, hydrocarbon ethers, such as tetrahydrofuran, ethyl ether, dioxane or the like, or aromatic hydrocarbons, such as benzene or the like. The solvent should be one in which both the Grignard reagent solution and the solution of the starting material steroid can be slowly blended by stirring. Though it is possible to conduct the Grignard reaction at an elevated temperature, it is recommended, in order to obtain a reaction course optimally selective, to choose a low reaction temperature. Suitably, the Grignard reaction is effected at between about $-15$ and $+15°$ C., preferably between about $0°$ and $5°$ C. It is especially surprising that in these temperature ranges the 6-keto group and any acyloxy groups present in the starting material steroid are not attacked by the Grignard reagent. Ordinarily in the process of this invention the selective Grignard reaction terminates after about 5 to 10 minutes. Undesired side reactions do not substantially occur even if the Grignard reagent acts on the starting material steroid over a longer time, for example, from about 30 to about 90 minutes.

If the moiety defined by the symbol Y is desired to be an alkynyl moiety, the introduction thereof can be effected by ethynylation of the 20-keto group by means of a metal acetylide, suitably by means of an alkali acetylide such as potassium or lithium acetylide in, for example, liquid ammonia or some other solvent inert to the reagent, for example, hydrocarbon ethers such as tetrahydrofuran, dioxane, or also hydrocarbons such as, for example, benzene. The solvent should of course be one which permits solubilization of the starting material steroid.

The hydration of the triple bond of the alkynyl moiety can be effected after the alkynylation according to the usual methods known to the art in the presence of an acid catalyst. Exemplary catalysts are for example mineral acids such as sulfuric acid; Lewis acids such as boron trifluoride etherate; mercuric compounds such as mercuric sulfate or mercuric oxide; and acidic ion exchangers. The reaction is suitably effected at room temperature but can also be effected at lower or higher temperatures.

The desired insertion of the 14α-hydroxy moiety can also be effected according to methods known in the field of steroid chemistry. An especially suitable purely chemical method is to effect the 14α-hydroxylation by using selenium dioxide or a selenium acid. As biochemical methods of 14α-hydroxylation there can be used microorganisms or the enzymes formed thereby which are known to be able to effect 14α-hydroxylation such as enzymes from the class Curvularia, preferably *Curvularia lunata*; or the class Absidia, preferably *Absidia regnieri*; or especially the class Heliocostylum, preferably *Heliocostylum piriforme*; or the class Mucor, preferably *Mucor griseo cyanus*.

After effecting the processes of this invention, if desired, according to methods known per se, hydroxy groups present in the product can be esterified or etherified. Acyloxy groups present can be saponified and ether or other protecting groups, for example, ketal groups, can be split. Suitable reaction conditions therefor, as also for the above-discussed selective hydration, are determined by the type of substituent represented by the symbol $R_2$. When $R_2$ is a 14α-hydroxy group reaction conditions should be avoided which are known to readily eliminate water from tertiary hydroxy groups. Other desired subsequent steps can be effected according to methods known per se. For example, esterification of hydroxy groups in other than the 14α-position can be effected by means of carboxylic acid halides or carboxylic acid anhydrides in the presence of pyridine.

The reaction products prepared according to the processes of this invention in part possess valuable pharmacological activity or they serve as intermediates for the preparation of active materials possessing diverse types of hormonal activity. The products of the processes of this invention are especially well suited as intermediates for the preparation of insect and crustacean metamorphosis hormones such as, for example, 20-hydroxy ecdysone.

An important starting material for the process of this invention is the previously undescribed compound, $\Delta^7$-5α-pregnene - 2β,3β-diol-6,20-dione diacetate. It can be prepared as follows:

490 ml of acetic anhydride was cooled to about $-10°$ C. and 295 ml. of nitric acid (D=1.51) was added thereto dropwise. To this mixture there was slowly added dropwise, so that the temperature did not rise above $-5°$ C., and with stirring and under a nitrogen atmosphere, 100 g. of 5α-pregnan-20β-ol-3,6-dione dissolved in 590 ml. of chloroform. The reaction mixture was then stirred for 20 minutes at $-5$ to $-10°$ C. and poured into ice water. The chloroform solution was separated, the aqueous phase extracted with methylene chloride and the combined organic extracts washed neutral and evaporated in vacuo. After recrystallization from isopropyl ether-methylene chloride there was obtained 96 g. of 5α-pregnan-20β-ol-3,20-dione nitrate, melting point 190.5–191.5° C. (with decomposition).

To 19 g. of 5α-pregnan-20β-ol-3,6-dione nitrate in 400 ml. of dry tri-tetrahydrofuran there was added with cooling a solution of 2.68 ml. of bromine and 3.9 g. of potassium acetate in 50 ml. of glacial acetic acid. The reaction solution was introduced with stirring into sodium acetate containing ice water and the 2α-bromo-5α-pregnan-20β-ol-3,6-dione nitrate which precipitated was collected by filtration under suction and recrystallized from isopropyl ether, melting point 152–153° C. (with decomposition).

18.2 g. of 2α-bromo-5α-pregnan-20β-ol-3,6-dione nitrate was reduced in 150 ml. of dry tetrahydrofuran at 0 to 5° C. with a solution of 20 g. of lithium aluminum tri-tert.-butoxy hydride in 90 ml. of tetrahydrofuran. The reaction mixture was then stirred in sulfuric acid-containing ice water. The precipitated bromohydrin was separated by filtration under suction, dried and acetylated by treatment in 80 ml. of pyridine with 40 ml. of acetic anhydride at room temperature for 15 hours. The reaction mixture was then stirred in ice water, the precipitate collected by filtration under suction, washed with water, dried and recrystallized from acetone yielding 2α-bromo - 5α - pregnane-3β,20β-diol-6-on-3-acetate-20-nitrate, melting at 230–231° C. (with decomposition).

30 g. of 2α-bromo-5α-pregnane-3β,20β-diol-6-on-3-acetate-20-nitrate in 600 ml. of glacial acetic acid and 12 ml. of water was heated under reflux for 3 hours with 19 g. of mercuric acetate. The precipitate was collected by filtration under suction, dried and then acetylated in 120 ml. of pyridine with 60 ml. of acetic anhydride. The crude product was chromatographed on silica gel. With methylene chloride there was eluted 5α-pregnane-2β,3β,20β-triol - 6 - one-2,3-diacetate-20-nitrate which was recrystallized from acetone/hexane, melting point 221–222° C. (with decomposition).

13.7 g. of 5α-pregnane-2β,3β,20β-triol - 6 - one-2,3-diacetate-20-nitrate in 300 ml. of tetrahydrofuran and 300 ml. of glacial acetic acid was stirred for 10 minutes at room temperature with 20 g. of zinc dust. The zinc dust was filtered off after which the filtrate was concentrated in vacuo and poured into ice water. The precipitated 5α-pregnane-2β,3β,20β-triol - 6 - one-2,3-diacetate was collected by filtration under suction and recrystallized from methylene chloride-isopropyl ether, melting point 230–233° C.

8.67 g. of 5α-pregnane-2β,3β,20β-triol - 6 - one-2,3-diacetate was dissolved in 200 ml. of glacial acetic acid and then mixed with 1.075 ml. of bromine in 20 ml. of glacial acetic acid and stirred for 2 hours at 50° C. The reaction mixture was then introduced with stirring into potassium acetate-containing ice water and the resulting precipitate collected by filtration under suction, washed neutral and dried. The crude product was chromatographed on silica gel and upon elution with methylene chloride/ethyl ether (7:3) yielded 7α-bromo-5α-pregnane-2β,3β,20β-triol - 6 - one-2,3-diacetate which upon recrystallization from isopropyl ether melted at 198–199° C. (with decomposition).

2.7 g. of 7α-bromo-5α-pregnane-2β,3β,20β-triol - 6-one-2,3-diacetate was dissolved in 54 ml. of glacial acetic acid, then 5.4 ml. of water added. Then at 5–10° C., 6.75 ml. of chromic acid solution (2.16 g. $CrO_3$ in 2 ml. of water and 23 ml. of acetic acid) was added dropwise followed by the addition of 0.32 ml. of concentrated sulfuric acid. After the reaction mixture was stirred for 10 minutes, water was added and the mixture extracted with methylene chloride. The methylene chloride solution was washed neutral, dried and concentrated yielding 7α-bromo-5α-pregnane-2β,3β-diol - 6,20 - dione diacetate which after recrystallization from acetone/hexane melted at 173.5–174.5° C.

2.4 g. of 7α-bromo-5α-pregnane-2β,3β-diol - 6,20 - dione diacetate in 25 ml. of dimethylformamide, 0.72 g. of lithium carbonate and 0.44 g. of lithium bromide was stirred for 3.5 hours at 120° C. Then the reaction mixture was poured into ice water, extracted with methylene chloride and the methylene chloride solution washed neutral and concentrated yielding Δ⁷-5α-pregnene-2β,3β-diol-6,20-dione diacetate which upon recrystallization from methylene chloride/isopropyl ether melted at 225–226° C. UV: ε 243=13,400.

The following examples are illustrative but not limitative of this invention.

EXAMPLE 1

2.7 ml. of 2-methyl-4-pentyn - 2 - ol-tetrahydropyranylether {prepared from 2-methyl-4-pentyn-2-ol [A. Mondon Ann. 577, 181 (1952)] by etherification with dihydropyran $K_{P14}$ 92–94° C.} in 20 ml. of dihydrofuran is added dropwise to an ethyl magnesium bromide solution (prepared from 317 mg. of magnesium, 1.1 ml. of ethyl bromide in 20 ml. of ethyl ether). The reaction mixture is then stirred for 1 hour at room temperature. This Grignard solution is then added dropwise to an ice cold solution of 600 mg. of Δ⁷-5α-pregnene-2β,3β-diol-6,20-dione diacetate in 60 ml. of tetrahydrofuran. The reaction mixture is then stirred for 1 hour at ca. 5° C., after which decomposition is effected with saturated ammonium chloride solution, the reaction mixture extracted with ethyl ether and the ether extract washed with water and evaporated in vacuo. After purification by preparative thin layer chromatography there was isolated 5α-cholest-7-en-22-yne-2β,3β,20α_F,25-tetrol-6-one - 2,3 - diacetate-25-tetrahydropyranylether. UV: ε 244=13,100.

EXAMPLE 2

280 mg. of mercuric oxide and 5.6 ml. of 2 N sulfuric acid were warmed for 5 minutes on a steam bath, then cooled to 20° C. and mixed with a solution of 530 mg. of 5α-cholest-7-en-22-yne-2β,3β,20α_F,25-tetrol - 6 - one-2,3-diacetate-25-tetrahydropyranylether in 56 ml. of methanol. The reaction mixture was then stirred for 2.5 hours at room temperature. The undissolved mercury compounds were filtered off, the filtrate extracted with methylene chloride, washed neutral and evaporated in vacuo yielding Δ⁷-5α-cholestene-2β,3β,20α_F,25-tetrol - 6,22 - dione-2,3-diacetate. UV: ε 244=13,200.

EXAMPLE 3

152 mg. of Δ⁷-5α-cholestene-2β,3β,20α_F,25-tetrol-6,22-dione-2,3-diacetate in 10.5 ml. of dioxane was stirred for 20 minutes at 90° with 48 mg. of selenium dioxide. The selenium was then directly removed from the reaction solution by preparative thin layer chromatography. The so-obtained Δ⁷-5α-cholestene - 2β,3β,14α,20α_F,25-pentol-6,22-dione-2,3-diacetate melted at 293–294° C. UV: ε 240=11,500.

EXAMPLE 4

20 mg. of Δ⁷-5α-cholestene-2β,3β,14α,20α_F,25-pentol-6,22-dione-2,3-diacetate in 1 ml. of methanol was stirred at room temperature for 3 hours with 3.5 mg. of potassium hydroxide. The reaction mixture was then heated for 5 minutes under reflux, neutralized with acetic acid and evaporated in vacuo. By preparative thin layer chromatography there was then isolated Δ⁷-5β-cholestene-2β,3β,14α,20α_F,25-pentol-6,22-dione. UV: ε 242=12,100.

EXAMPLE 5

20 mg. of Δ⁷-5α-cholestene-2β,3β,14α,20α_F,25-pentol-6,22-dione-2,3-diacetate in 1 ml. of ethanol was stirred for 30 minutes at room temperature with 3.5 mg. of potassium hydroxide. The reaction solution was then neutralized with acetic acid, evaporated in vacuo and by preparative thin layer chromatography there was isolated Δ⁷-5α-cholestene-2β,3β,14α,20α_F,25-pentol-6,22-dione. UV: ε 240=11,700.

EXAMPLE 6

390 mg. of 5α-cholest-7-en-22-yne-2β,3β,20α_F,25-tetrol-6-one-2,3-diacetate - 25 - tetrahydropyranylether was dissolved in 8 ml. of tetrahydrofuran and, after addition of 0.8 ml. of 2 N sulfuric acid, stirred for 1 hour at 20° C. The reaction solution was then diluted with ethyl acetate, washed with sodium bicarbonate solution and sodium chloride solution and evaporated in vacuo. Upon recrystallization from acetone/hexane there was obtained 280 mg. of 5α-cholest-7-en-22-yne-2β,3β,20α_F,25 - tetrol-6-one-2,3-diacetate melting at 208.5–210° C.

EXAMPLE 7

200 mg. of 5α-cholest-7-en-22-yne-2β,3β,20α_F,25-tetrol-6-one-2,3-diacetate in 20 ml. of absolute methanol was stirred for 5 minutes at room temperature with 200 mg. of mercuric acetate and 0.1 ml. of boron trifluoride etherate. 1 ml. of pyridine and 200 ml. of ice water were then added to the reaction mixture, after which it was extracted with ethyl acetate. The extract was washed with 0.1 N hydrochloric acid and sodium chloride solution and then evaporated in vacuo yielding 190 mg. of Δ⁷-5α-cholestene-2β,3β,20α_F,25 - tetrol - 6,22 - dione - 2,3 - diacetate. UV: ε 244=13,400.

What is claimed is:

1. A process for producing a cholest-6-one-20α_F-ol of the formula:

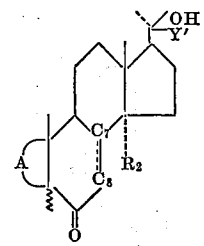

wherein $R_2$ is hydrogen or hydroxy, Y' is lower alkyl or lower alkynyl which can be substituted in the 25-position with esterified or etherified hydroxy, $C^7=\!=\!=\!=\!C^8$ is a saturated or unsaturated carbon to carbon bond, and A is the A-ring in the steroid nucleus; which in addition to the above substituents, can contain a hydroxy or a lower alkanoyloxy substituent in the 2 and 3-positions or an isopropylidenedioxy moiety in the 2,3-position or an oxo moiety in the 3-position; comprising reacting a compound of the formula:

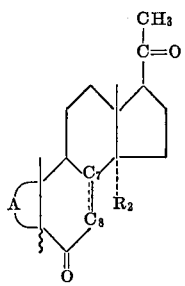

wherein $R_2$ and A are as above and

is a saturated or unsaturated carbon-carbon bond with an alkali metal acetylide or with a compound of the formula:

$$Y \cdot MgX$$

wherein Y is lower alkyl or alkynyl groups which can be unsubstituted or substituted in the 4-position with etherified or esterified hydroxy and X is bromine, chlorine or iodine.

2. A proces for producing a cholest-6,22-dione-20$\alpha_F$-ol of the formula:

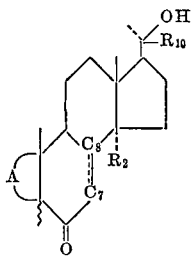

wherein $R_2$ is hydrogen or hydroxy; $R_{10}$ is a lower alkyl which is substituted in the 22-position with an oxo group which can be substituted in the 25-position with a hydroxy, esterified hydroxy or etherified hydroxy;

is a saturated or unsaturated carbon-carbon bond; A is the A ring in the steroid nucleus, which in addition to the above substituents can contain a hydroxy or lower alkanoyloxy substituent in the 2- and 3-positions, an isopropylidenedioxy moiety in the 2,3-position or an oxo moiety in the 3-position comprising hydrating the 22 (23) triple bond of a cholest-6-one-20$\alpha_F$-ol-22-yne of the formula:

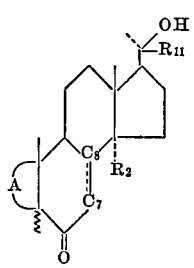

wherein A is as above and $R_{11}$ is lower alkynyl containing a triple bond in the 22 (23) position and which may be substituted with hydroxy, esterified hydroxy or etherified hydroxy in the presence of an acid catalyst to form said cholest-6,22-dione-20$\alpha_F$-ol.

3. A cholest-6-one-20$\alpha_F$-ol of the formula:

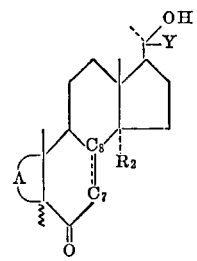

wherein $R_2$ is hydrogen or hydroxy; Y is straight or branched chain lower alkyl, or lower alkynyl which can be substituted in the 25-position with hydroxy, esterified hydroxy or etherified hydroxy, or with an oxo group in the 22-position;

is a saturated or unsaturated carbon-carbon bond; A is the A-ring in the steroid nucleus; which in addition to the above-specified substituents, can contain a hydroxy moiety or lower alkanoyloxy moiety in the 2-3-positions; an isopropylidenedioxy moiety in the 2,3-position; or an oxo moiety in the 3-position.

4. A process as in claim 1 wherein the reagent is $Y \cdot MgX$ and the reaction is effected between $-10°$ C. and $+30°$ C.

5. A process as in claim 1 wherein the starting material is $\Delta^7$-5$\alpha$-pregnene-2$\beta$,3$\beta$-diol-6,20-dione diacetate.

6. A process as in claim 5 wherein the reagent is a Grignard reagent formed from 2-methyl-4-pentyn-2-ol.

7. A process as in claim 2 wherein the hydration is effected in the presence of sulfuric acid/mercuric oxide.

8. A compound as in claim 3 which is 5$\alpha$-cholest-7-en-22-yne-2$\beta$,3$\beta$-di-lower alkoxy-20$\alpha_F$,25-diol.

9. A compound as in claim 3 which is $\Delta^7$-5$\alpha$-cholesten-2$\beta$,3$\beta$,20$\alpha_F$,25-tetrol-6,22-dione-2,3-diacetate.

10. A compound as in claim 3 which is $\Delta^7$-5$\alpha$-cholesten-2$\beta$,3$\beta$-di-lower alkoxy-14$\alpha$,20$\alpha_F$,25-triol-6,22-dione.

11. A compound as in claim 3 which is $\Delta^7$-5$\alpha$-cholesten-2$\beta$,3$\beta$,14$\alpha$,20$\alpha_F$,25-pentol-6,22-dione-2,3-diacetate.

12. A compound as in claim 3 which is $\Delta^7$-5$\beta$-cholesten-2$\beta$,3$\beta$,14$\alpha$,20$\alpha_F$,25-pentol-6,22-dione.

13. A compound as in claim 3 which is 5$\alpha$-cholest-7-en-22-yne-2$\beta$,3$\beta$-di-lower alkoxy-20$\alpha_F$,25-diol-6-one-25-tetrahydropyranylether.

14. A compound as in claim 3 wherein $R_1$ hydrogen and Y is 2-methyl-2-hydroxy-4-pentyn-5-yl.

15. A compound as in claim 3 wherein Y is 2-methyl-2-hydroxy-5-oxo-pent-5-yl and $R_1$ is hydrogen.

References Cited

Thompson et al. "Chem. Communications" (1967) pp. 650–653 relied on.

ELBERT L. ROBERTS, Primary Examiner

U.S. Cl. X.R.
260—397.2, 397.4